US010066097B2

(12) United States Patent
Bellomo et al.

(10) Patent No.: US 10,066,097 B2
(45) Date of Patent: Sep. 4, 2018

(54) THERMOFUSIBLE COMPOSITION FOR SLUSH MOULDING (75) Inventors: Leonardo Bellomo, Forli FC (IT); Alessandro Carfagnini, Forli FC (IT); Marianne Stol, Haarlem (NL); Freddy Vervoort, Meldert (BE)

(73) Assignee: Kraton Polymers U.S. LLC, Houston, TX (US)

(*) Notice: Subject to any disclaimer, the term of this patent is extended or adjusted under 35 U.S.C. 154(b) by 476 days.

(21) Appl. No.: 13/243,533

(22) Filed: Sep. 23, 2011

(65) Prior Publication Data

US 2012/0070665 A1    Mar. 22, 2012

(51) Int. Cl.
| C08L 53/02 | (2006.01) |
| C08L 23/20 | (2006.01) |
| B29C 41/18 | (2006.01) |
| B29C 41/00 | (2006.01) |
| B29K 105/00 | (2006.01) |
| C08L 23/10 | (2006.01) |

(52) U.S. Cl.
CPC .......... C08L 53/025 (2013.01); B29C 41/003 (2013.01); B29C 41/18 (2013.01); B29K 2105/0085 (2013.01); C08L 23/10 (2013.01); C08L 23/20 (2013.01); Y10T 428/2982 (2015.01)

(58) Field of Classification Search
USPC .......... 428/35.7, 402; 525/88, 98, 191, 232, 525/236; 264/69; 524/505
See application file for complete search history.

(56) References Cited

U.S. PATENT DOCUMENTS

| 3,670,054 A | | 6/1972 | De La Mare et al. | |
| 3,700,633 A | * | 10/1972 | Wald | 525/339 |
| 6,072,004 A | * | 6/2000 | Migchels et al. | 525/191 |
| 6,906,144 B2 | | 6/2005 | Jeong et al. | |
| 7,001,956 B2 | * | 2/2006 | Handlin et al. | 525/342 |
| 7,267,855 B2 | * | 9/2007 | Handlin et al. | 428/34.1 |
| 2006/0100380 A1 | | 5/2006 | Delphi | |
| 2006/0178485 A1 | * | 8/2006 | Shimakage et al. | 525/242 |
| 2006/0286324 A1 | * | 12/2006 | Helmenstein | 428/35.7 |
| 2007/0055015 A1 | * | 3/2007 | Flood et al. | 525/88 |

FOREIGN PATENT DOCUMENTS

| CN | 1282352 A | 1/2001 |
| EP | 0733677 A1 | 9/1996 |
| EP | 0659831 B1 | 8/1998 |
| EP | 0673970 B1 | 8/1999 |
| EP | 0811657 B1 | 4/2002 |
| EP | 0733677 B1 | 4/2003 |
| EP | 1605002 A1 | 12/2005 |
| EP | 1396525 B1 | 5/2006 |
| EP | 1474458 B1 | 10/2007 |
| EP | 2009053 A1 | 12/2008 |
| JP | 11092602 A | 6/1999 |
| JP | 11342509 A | 12/1999 |
| JP | 2003246910 A | 9/2003 |
| TW | 200722476 | 6/2007 |
| WO | 9503447 A1 | 2/1995 |
| WO | 9932558 A1 | 7/1999 |
| WO | 03066731 A1 | 8/2003 |
| WO | WO 03/066731 A1 | 8/2003 |

OTHER PUBLICATIONS

Valligny et al.; SAE International Technical Papers ; 1999-01-1019.*
Foreign communication from a related counterpart application—Search Report, Taiwan Patent Application No. 100102922, dated Apr. 1, 2015, 1 page.

* cited by examiner

Primary Examiner — Liam J Heincer
(74) Attorney, Agent, or Firm — Jessica Zimberlin Eastman; Cantor Colburn LLP (57) ABSTRACT A thermofusible composition comprising from about 40 to about 70 weight percent of a selectively hydrogenated styrenic block copolymer (HSBC), and from about 1 to about 30 weight percent of a butylene homopolymer, a butylenes copolymer, or a combination thereof, wherein the HSBC is:
(i) prior to hydrogenation each A block is a mono alkenyl arene polymer block and each B block is a controlled distribution copolymer block of at least one conjugated diene and at least one mono alkenyl arene;
(ii) the weight percent of mono alkenyl arene in each B block is from about 10 to about 40 weight percent;
(iii) each B block has a styrene blockiness index of less than 10 percent; and
(iv) the weight percent of vinyl in each B block is at least about 40 weight percent.

25 Claims, 2 Drawing Sheets

THERMOFUSIBLE COMPOSITION FOR SLUSH MOULDING

TECHNICAL FIELD

This invention concerns a thermofusible composition that may be used for slush moulding and similar (sinter) moulding techniques such as rotational moulding. More specifically, it concerns a thermofusible composition based on a thermoplastic elastomer (TPE), wherein the TPE is a hydrogenated styrenic block copolymer (HSBC).

BACKGROUND ART

Slush moulding is a process whereby hollow articles may be prepared from a TPE. The process typically involves heating a hollow mould into which is poured a TPE composition in the form of a powder and/or in the form of micropellets. The mould is then rotated and heated, whereby the TPE composition is sintered into a "skin". When the mould is cooled, the finished product may be removed. The finished product may be of simple or complex form. A typical product is a dashboard cover or airbag cover used in automotive applications. Other automotive interior parts include glove door boxes, door panels, consoles etc. In this case, design flexibility, recyclability, both low and high temperature performance, light stability, weight savings, and high productivity are key performance indicators.

Currently, PVC is used for dashboard skins. PVC has reasonable melting/fusing properties (235 DEG C. and 80-150 seconds); suitably low viscosity allowing good flow; is available as powder; has good tensile strength; has good UV stability; has good scratch resistance; and is low in price. The disadvantage of PVC results from relatively high density (1.4), and its poor reputation with customers and legislators due to its impact on the environment, its use therein of specific plasticizers that cause fogging, odour and tackiness, and finally its lack of recyclability.

With the use of compositions based on hydrogenated styrenic block copolymers (HSBC), sometimes referred to as compounds, many of the PVC drawbacks can be overcome. This concept has therefore been the focus of innovative efforts. Although PVC is still the common material for commercially slush moulding. The current HSBC compositions are yet lacking in their ability to provide materials which easily and quickly flow and fuse in conventional commercial equipment yielding strong and flexible articles.

EP 673970 A concerns conveyor belts wherein a block copolymer composition is applied onto the fabric either as a hot melt or as a finely divided powder, which is subsequently fused into a continuous layer by heat treatment.

WO 99/32558 provides a thermofusible elastomer composition comprising: (a) 100 parts by weight of a selectively hydrogenated block copolymer component comprising an A'B' block copolymer and a multiblock copolymer having at least two end blocks A and at least one mid block B wherein the A' and A blocks are monoalkenyl arene polymer blocks and the B' and B blocks are substantially completely hydrogenated conjugated diene polymer blocks, the number average molecular weight of the A' and A blocks are in the range from 3,000 to 7,000 and the monoalkenyl arene content of the multiblock copolymer is in the range from 7 to 22 weight percent; (b) 20 to 50 phr of at least one high melt flow polyolefin; (c) 0 to 19 phr of a plasticizing oil selected from naphthenic oils and paraffinic oils; and (d) 0 to 45 phr of at least one poly(conjugated diene) block compatible resin wherein the elastomer composition has a particle size of 1400 micron or less. This composition is used in low shear processes.

WO 95/03447 concerns recyclable carpets, obtainable by means of the application of a powdered block copolymer composition, comprising at least: a) a block copolymer, containing at least two terminal poly(vinylaromatic) blocks and at least one internal poly(conjugated diene) block, the original ethylenical unsaturation in which may optionally be selectively hydrogenated, which block copolymer may optionally be grafted with a polar entity; b) a non-aromatic plasticizing oil; c) a terminal block compatible resin on the backside of a carpet fabric; and block copolymer compositions for the manufacture of such carpets.

EP 659831 A relates to a free flowing powder composition with a particle size of 800 μm or less comprising: (a) 100 parts by weight of a block copolymer comprising at least one poly(monovinyl aromatic hydrocarbon) block and at least one hydrogenated or unhydrogenated poly(conjugated diene) block and having a monovinyl aromatic hydrocarbon content in the range of from 10 to 60 weight percent based on total weight of block copolymer; (b) 50 to 200 parts by weight of plasticizing oil; (c) 50 to 200 parts by weight of a poly(monovinyl aromatic hydrocarbon) block compatible resin; and (d) 0.1 to 10 weight percent based on total weight of composition of a dusting agent. Process for the preparation of the above free flowing powder composition, comprising first melt blending all components except the dusting agent and the blowing agent, if present, followed by cooling. The resulting composition is then pelletized or granulated and the granules or pellets thus obtained are cryogenically milled. Finally, the dusting agent and optionally the blowing agent are dry-blended with the powder resulting from the previous step. The free flowing powder composition is very useful for obtaining homogeneous layers having a smooth surface. These layers can be applied successfully for carpet backings, conveyor belts, bottle cap sealants.

JP 11092602 concerns a thermoplastic elastomer composition for powder slush moulding, made by compounding a polypropylene resin, a hydrogenated styrene butadiene rubber, a process oil, an elastomer (e.g. a styrene-(ethylene-propylene)-styrene block copolymer), an adhesion-improving agent (e.g. an acid modified polypropylene or a hydroxyl-containing polypropylene), an internal mold releasing agent (e.g. dimethylsiloxane) and optionally an organic peroxide.

Likewise, in JP 11342509 a thermoplastic elastomer composition is produced for powder moulding by adding at least a hydrogenated styrene/butadiene rubber (H-SBR), a process oil and an elastomer excellent in oil absorbing capacity to a polypropylene resin with MFR (melt flow rate JIS K720) of 100-800 g/10 min and kneading these components under heating.

In EP 811657 A a thermoplastic elastomer composition for powder slush moulding is described, made up of a polypropylene resin, hydrogenated styrene/butadiene rubber, a process oil and an elastomer excellent in oil absorbing power. A process for making that thermoplastic elastomer composition may include the addition of an organic peroxide to the above components and kneading the obtained mixture while heating.

U.S. Pat. No. 6,906,144 describes a polypropylene-based resin composition for powder slush moulding which is a mixture of a polypropylene homopolymer, copolymer, or terpolymer; an olefin rubber; a styrene rubber; a process oil; and a polypropylene wax, wherein the composition is excellent in low-temperature impact resistance and heat resistance and has no offensive odor. The composition can be formed by a cryofreeze pulverization method in the presence of liquid nitrogen into a powder having an average particle size of 200 to 300 μm suitable for powder slush moulding. The powder can be adhered to a polyurethane foamed layer and a surface treating agent without a primer coating. The powder is particularly suitable for forming the interior surface for manufacture of an automobile surface such as an instrument panel.

In JP 2003246910 a slush-moulding material is disclosed that is composed of a hydrogenated copolymer composition consisting of 50-97 weight percent hydrogenated copolymer (1) and 3-50 weight percent. thermoplastic resin (2). The hydrogenated copolymer (1) comprises a conjugate diene and a vinyl aromatic compound composition containing (a) >50 weight percent to ≤90 weight percent vinyl aromatic compound and (b) ≤40 weight percent vinyl aromatic polymer block in the copolymer having (c) 50,000-1,000,000 weight average molecular weight and (d) ≥75% hydrogenated double bonds of the conjugated diene compound in the copolymer. The hydrogenated copolymer composition is pulverized and used for powder-slush moulding to provide a moulded product suitable for the skin material From EP 0733677 A a composition is known, that is suitable for use in rotational moulding, and that is based on a block copolymer of the type SEBS (having at least two polystyrene end blocks and a hydrogenated conjugated diene midblock). The thermoplastic material is in the form of a very fine powder or micropellets that in combination with a dusting agent flows and spreads to form a fused thermoplastic layer on the inner surface of a mould.

In EP 1396525 A similar compositions for soft sheet applications are described, comprising a blend of polypropylene and a styrenic elastomer. The composition may in the form of a powder and/or a micropellet form. The composition may comprise a ethylene copolymer. In the process of slush moulding, improved flow is achieved by the addition of a suitable flow additive.

In EP 1605002 A HSBC compositions are described having good processability, flexibility, weather resistance and various other properties. However a composition that excels in slush moulding is not yet disclosed, In U.S. 2006100380 again a slush moldable TPO composition is provided, comprising a blend of PP, styrenic elastomer, a linear low density PE and an oil.

Likewise EP 2009053 A discloses a TPO composition having improved melt viscosity and methods of making the same.

Finally, in WO 03/066731 controlled distribution block copolymers are disclosed that may be compounded with a large variety of other polymers, including olefin polymers, styrene polymers, tackifying resins, and engineering thermoplastic resins. The compounds may, for instance, be used for slush moulding of automotive skins.

Despite the many patent references on compositions for slush moulding, still many commercial products are based on PVC. PVC has various disadvantages, which includes fogging, the release of volatile organic compounds, oil and plasticizers, odour, etc. These disadvantages could be overcome with a composition based on a SBC, but still the properties and/or the processability of these new SBC compounds are not good enough.

The properties that are required to for e.g. use in automotive applications (dashboards) typically include a tensile strength σ of 11±2 MPa and an elongation at break ε of ≥250%. In practice, a tensile strength σ≥10 is required.

Other properties include hardness, density, abrasion resistance, scratch resistance, fogging, flammability and colour fastness to light. More specifically, in automotive applications (dashboards) the new composition should meet the following performing characteristics:
a hardness between 60 and 95 Shore A according to ASTM-D2240;
a tensile strength ≥8 MPa according to ASTM D412-C;
passing the compound melting test.

The compound melting test is carried out in order to determine the suitability of a composition to slush moulding/rotomoulding processing. The test indicates if a thermoplastic material fulfils certain prescribed melting behaviour characteristics when heated under controlled conditions. A specimen passes the test when both a visual and a thickness variation evaluation are indicated as positive. The compound melting test is described in more detail in the experimental section.

Moreover, in addition to the above properties also the appearance and feel is important. For instance, the final product should not have a plastic (sticky or oily) feel. It should not look "cheap" or of low quality, related to the consumers' impression when low quality, inexpensive plastics are used. Likewise, the final product should be free from pinholes, but also show no undesired flow patterns or similar irregularities.

In terms of processability, the requirement of great importance is the melt speed, which can be tested for instance by the method described hereinafter.

Herein we refer to melt viscosity at any given temperature as that property measured at low shear rates, such as that defined by zero shear rate viscosity. The melt viscosity of the thermofusible compositions for use in slush moulding should be, but is not limited to, in the range of 50 Pa·s to 250 Pa·s over the processing temperature range of 180 DEG C. to 260 DEG C. as measured at low shear rate such as that applied by parallel plate rheometer.

Interestingly, now a composition has been found that can be used without difficulty by the end users currently using PVC in slush moulding applications (no need of new equipment) whereby products are made at lower processing temperature and reduced cycle times, compared to PVC. The product is environmental friendly (halogen free, easy recyclable), has an excellent feel and an excellent combination of mechanical properties. The invention is thus based on a specific compound.

DISCLOSURE OF INVENTION

The invention provides a thermofusible composition as claimed in claim 1. Moreover a method is provided to produce a fused thermoplastic layer on the inner surface of a mould using the new composition. Also provided are dashboards and similar products comprising a fused thermoplastic layer as based on the new composition.

MODES(S) FOR CARRYING OUT THE INVENTION

Figure 1:
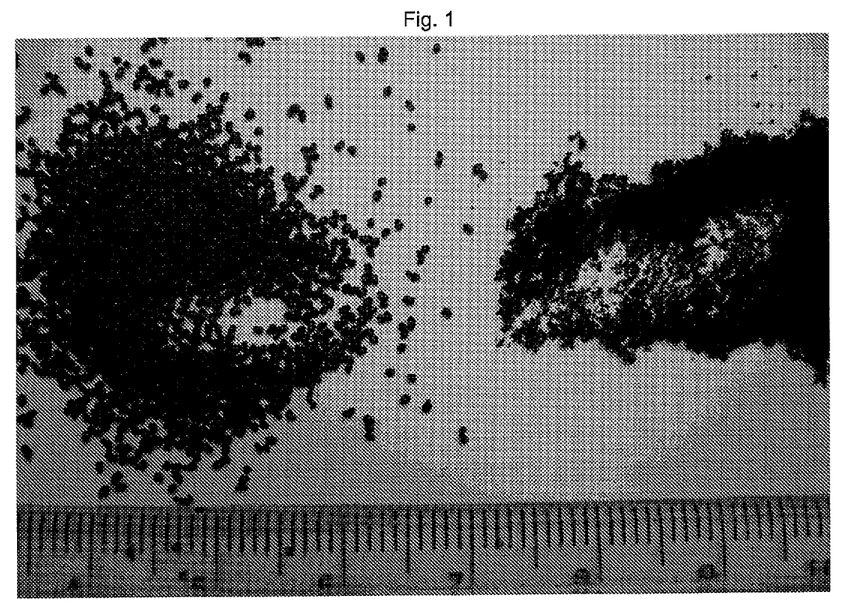
FIG. 1 is a photo of a dashboard skin, as may be made from the new thermofusible composition by slush moulding.
Figure 2:
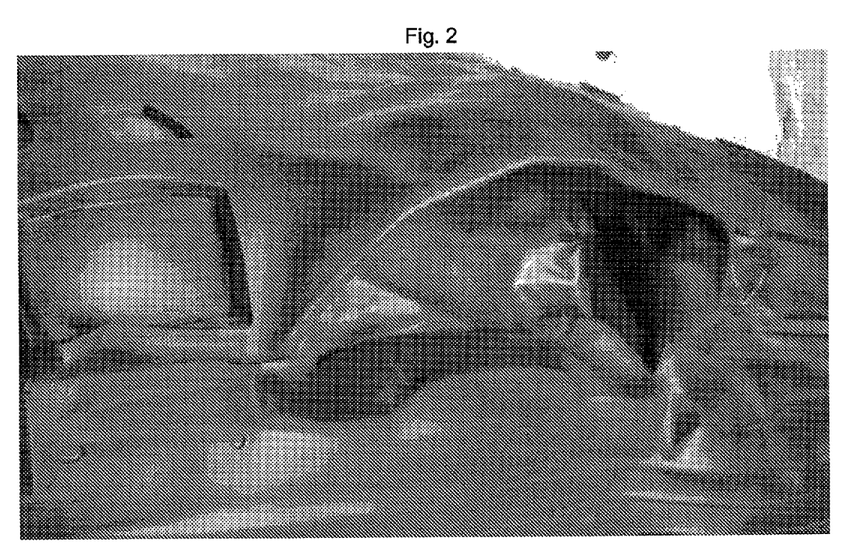
FIG. 2 is a photo of the thermofusible composition (micropellets and powder) as used in slush moulding.
Figure 3:
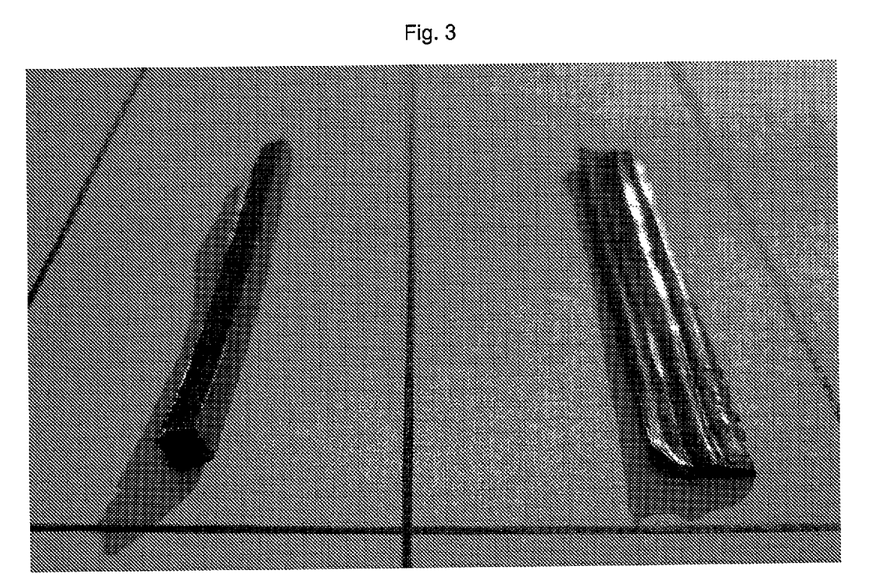
FIG. 3 is a photo of a specimen rated 'Fail' (left) and a specimen rated 'Pass' (right) in the melting test. The left hand specimen shows that sharp/squared edges are still present, whereas the right specimen shows rounded/smooth edges (which are evidence of melting) and no surface fails.

The thermofusible composition comprises:
(i) from about 40 to about 70 weight percent of a selectively hydrogenated styrenic block copolymer (HSBC);
(ii) from 0 to about 15 weight percent of a propylene homopolymer and/or propylene copolymer thereof (PP);
(iii) from about 1 to about 30 weight percent of a butylene homopolymer (iiia), a butylene copolymer (iiib), or a combination of the butylene homopolymer (iiia) and the butylene copolymer (iiib) (PB);
(iv) from 0 to about 20 weight percent of a plasticizing oil selected from naphthenic oils and paraffinic oils;
(v) from 0 to about 10 weight percent of a scratching agent;
(vi) from 0 to about 10 weight percent of a dusting agent; and
(vii) from 0 to about 10 weight percent of one or more additives.

The HSBC to be used as component (i) in the new composition is an organic polymer containing mono alkenyl arene end blocks A and a unique mid block B of a mono alkenyl arene and a conjugated diene in which the mono alkenyl arene and conjugated diene are arranged in a controlled distribution. Block copolymers having a controlled distribution block B are known and have been described in EP 1474458 A. For purposes hereof, "controlled distribution" is defined as referring to a molecular structure having the following attributes: (1) terminal regions adjacent to the mono alkenyl arene homopolymer ("A") blocks that are rich in (i.e., have a greater than average amount of) conjugated diene units; (2) one or more regions not adjacent to the A blocks that are rich in (i.e., have a greater than average amount of) mono alkenyl arene units; and (3) an overall structure having relatively low blockiness. For the purposes hereof, "rich in" is defined as greater than the average amount, preferably greater than 5% the average amount.

The styrene blockiness index is simply the percentage of blocky styrene (or other alkenyl arene) to total styrene units:

Blocky %=100 times (Blocky Styrene Units/Total Styrene Units)

For the HSBC used in the thermofusible composition of the present invention, it is preferred that the styrene blockiness index of block B be less than about 10.

Preferably, the controlled distribution copolymer block has three distinct regions—conjugated diene rich regions on the end of the block and a mono alkenyl arene rich region near the middle or center of the block. Typically the region adjacent to the A block comprises the first 15 to 25% of the block and comprises the diene rich region(s), with the remainder considered to be arene rich. The term "diene rich" means that the region has a measurably higher ratio of diene to arene than the arene rich region. What is desired is a mono alkenyl arene/conjugated diene controlled distribution copolymer block, wherein the proportion of mono alkenyl arene units increases gradually to a maximum near the middle or center of the block (when describing an ABA structure) and then decreases gradually until the polymer block is fully polymerized. This structure is distinct and different from the tapered and/or random structures discussed in the prior art.

The mono alkenyl arene is preferably selected from the group consisting of styrene, alpha-methylstyrene, para-methylstyrene, vinyl toluene, vinylnaphthalene, and para-butyl styrene or mixtures thereof. Of these, styrene is most preferred. The conjugated diene is preferably selected from the group consisting of 1,3-butadiene and substituted butadienes such as isoprene, piperylene, 2,3-dimethyl-1,3-butadiene, and 1-phenyl-1,3-butadiene, or mixtures thereof. Of these, 1,3-butadiene is most preferred. As used herein, and in the claims, "butadiene" refers specifically to "1,3-butadiene".

The selectively hydrogenated mono alkyl arene—conjugated diene block copolymers may have a linear configuration such as A-B-A. The block copolymers can also be structured to form a branched (branched) polymer, $(A-B)_nX$ or $(A-B-A)_nX$, or both branched and linear types of structures can be combined in a mixture. Some A-B diblock polymer can be present up to about 30 weight percent of the HSBC, but preferably at least about 70 weight percent of the block copolymer is A-B-A or branched (or otherwise branched so as to have 2 or more terminal resinous blocks per molecule) so as to impart strength. Other structures include $(A-B)_n$ and $(A-B)_nA$. In the above formulas, n is an integer from about 2 to about 30, preferably from about 2 to about 15, more preferably from about 2 to 6 and X is the remnant or residue of the coupling agent.

It is also important to control the molecular weight of the various blocks. Desired number average block weights are from about 5.0 to about 7.5 kg/mol for the mono alkenyl arene A block. For the triblock, which may be a sequential ABA or coupled $(AB)_2 X$ block copolymer, the total apparent number average molecular weight should be from about 70 to about 150 kg/mol, preferably from about 125 to about 150 kg/mol, and for the coupled copolymer from about 35 to about 75 kg/mol per arm, preferably from about 62,500 to about 75,000 per arm. With the expression "apparent", as used throughout the specification, is meant the molecular weight of a polymer as measured with gel permeation chromatography (GPC) also referred to as Size Exclusion Chromatography (SEC) using polystyrene calibration standards (using a method analogue to the method described in ASTM D5296-05). Reference is made herein to number average molecular weight. The molecular weight distribution $(M_w/M_n)$ for anionically polymerized polymers is small. Therefore, as is common in the art, as number average molecular weight the peak position is used, since the differences between the peak molecular weight $(M_p)$ and the number average molecular weight $(M_n)$ are very small. Another important aspect of the present invention is to control the microstructure or vinyl content of the conjugated diene in the controlled distribution copolymer block. The term "vinyl content" refers to the fact that a conjugated diene is polymerized via 1,2-addition (in the case of butadiene—it would be 3,4-addition in the case of isoprene). Thus, "vinyl" in no way refers to PVC. When referring to the use of butadiene as the conjugated diene, it is preferred that at least about 40 weight percent, preferably at least 60 weight percent, more preferably from about 60 to about 80 weight percent and most preferably from about 65 to about 75 weight percent of the condensed butadiene units in the copolymer block have 1,2 vinyl configuration as determined by proton NMR analysis.

For the controlled distribution B block the weight percent of mono alkenyl arene in each B block is from about 10 weight percent to about 40 weight percent, preferably from about 15 to 30 weight percent, most preferably from about 20 weight percent to about 25 weight percent.

The block copolymer is selectively hydrogenated. Hydrogenation can be carried out via any of the several hydrogenation or selective hydrogenation processes known in the prior art. For example, such hydrogenation has been accomplished using methods such as those taught in, for example, U.S. Pat. No. 3,670,054, and U.S. Pat. No. 3,700,633. Hydrogenation can be carried out under such conditions that at least about 90 percent of the conjugated diene double bonds have been reduced, and between zero and 10 percent of the arene double bonds have been reduced. Preferred ranges are at least about 95 percent of the conjugated diene double bonds reduced, and more preferably about 98 percent of the conjugated diene double bonds are reduced. Alternatively, it is possible to hydrogenate the polymer such that aromatic unsaturation is also reduced beyond the 10 percent level mentioned above. In that case, the double bonds of both the conjugated diene and arene may be reduced by 90 percent or more.

In other words, the HSBC (i) is preferably a selectively hydrogenated block copolymer having the general configuration A-B-A, (A-B)$_n$, (A-B-A)$_n$, (A-B-A)$_n$X, (A-B)$_n$X or mixtures thereof, where n is an integer from 2 to about 30, preferably 2 to about 15, more preferably 2 to 6 and X is coupling agent residue and wherein:

a. prior to hydrogenation each A block is a mono alkenyl arene polymer block and each B block is a controlled distribution copolymer block of at least one conjugated diene and at least one mono alkenyl arene;

b. subsequent to hydrogenation about 0-10%, preferably less than 5% of the arene double bonds have been reduced, and at least about 90% preferably about 95 or more percent still more preferably about 98 or more percent of the conjugated diene double bonds have been reduced;

c. the total apparent number average molecular weight (determined by GPC) is in the range of from about 70 to about 150 kg/mol, preferably from about 125 to about 150 kg/mol, for a linear HSBC and from about 35 to about 75 kg/mol, preferably from about 62.5 to about 75 kg/mol for each arm of a branched HSBC, wherein each A block has a number average molecular weight from about 5.0 to about 7.5 kg/mol;

d. each B block comprises terminal regions adjacent to the A blocks that are rich in conjugated diene units and one or more regions not adjacent to the A blocks that are rich in mono alkenyl arene units;

e. the total amount of mono alkenyl arene in the hydrogenated block copolymer is from about 20 to about 45 weight percent, preferably from about 30 to about 40 weight percent; and f. the weight percent of mono alkenyl arene in each B block is from about 10 to about 40 weight percent, preferably from about 15 to about 30 weight percent, most preferably from about 20 to about 25 weight percent;

g. each B block has a styrene blockiness index of less than 10 percent; and h. the weight percent of vinyl in each B block is at least about 40 weight percent.

As component (ii) a propylene homopolymer, copolymer (which definition includes terpolymers) may be included, but the use of a propylene polymer (PP) is not essential. Suitable propylene polymers include, but are not limited to, crystalline polypropylene and co- and terpolymers that contain minor amounts, usually not greater than about 15 wt. % based on the total weight of the polypropylene, of other olefin monomers, for example ethylene, butene, octene and the like. Suitable propylene polymers have melt flow rates (MFR(D): ASTM D 1238) from about 25 to about 150 grams/10 minutes (g/10 min.), preferably from about 75 to about 125 g/10 min, more preferably about 100 g/10 min, measured at 230 DEG C. employing a 2.16 kilogram (kg) weight. A suitable PP copolymer is Moplen™ EP648V from Lyondellbasell.

Component (iii) can be a homopolymer of butylene ("PB homopolymer") or a copolymer of butylene ("PB copolymer") with a minor amount of another α-olefin having 2 to 20 carbon atoms or a combination thereof. Preferably, component (iii) is a combination of the homopolymer and the copolymer (which definition includes terpolymers). Component (iii) can be present in an amount of from about 1-30 weight percent, more preferably in an amount of from 10 to 30 weight percent. In case of the combination of the homopolymer and the copolymer, the weight to weight ratio of the homopolymer to the copolymer is preferably from about 1:1 to about 10:1, more preferably from about 2:1 to about 3:1.

The melt flow rate (MFR(E): ASTM D 1238) of the PB homopolymer is suitably in the range of about 0.1 to 500 g/10 min, preferably from about 0.5 to 250 g/10 min and more preferably about 200 g/10 min, measured at 190 DEG C. employing a 2.16 kg weight. A suitable PB homopolymer is Polybutene-1 grade PB0800M from Lyondellbasell.

Considering the copolymer, the ratio of another α-olefin to be copolymerized is 20 mole % or less, preferably 10 mole % or less and particularly preferably 5 mole % or less. Examples of another α-olefin to be copolymerized include ethylene, propylene, hexene, 4-methylpentene-1, octene-1, decene-1, octadecene-1, etc. A preferred PB copolymer is the plastomer sold under the trademark Koattro, grade KT AR03 or KT AR05 (by LyondellBasell). This copolymer has a density (according to ISO 1183) of about 890 kg/m$^3$, a melting temperature (measured by DSC) of about 114 DEG C., and a MFR(E) (190 DEG C./2.16 kg) of about 0.8 g/10 min.

A plasticizer may be included, e.g., in the form of a white paraffinic oil or other petroleum derived oils, olefin oligomers, low molecular weight polymers, as well as vegetable and animal oil and their derivatives. The plasticizer should cause no fogging or bleeding.

The thermofusible composition may further comprise additives such as scratching and dusting agents, UV and thermal stabilizers (like Lowilite™ 26, Tinuvin™ 326 from BASF and Uvasorb™ S26 from 3V Sigma), antioxidants (like Irganox™ 1010, Irgafos™ 168, organic and inorganic fillers, pigments (like Plasblak® from Cabot, releasing agents, dispersants and other additives.

Suitable scratching agents, also known as scratch inhibiting agents, are fatty acid amides such as oleamide and erucamide and siloxanes, e.g. high molecular weight polydimethyl siloxane. The thermofusible composition may comprise up to 10 weight percent, preferably from about 1 to about 3 weight percent of the scratching agent.

The dusting agent is suitably an inorganic fine powder with a volume average particle diameter 0.1 to 20 μm, such as magnesium oxide (like Maglite™ D from HallStar), and zinc oxide. Also suitable are hydrated silicates such as talc and montmorillonite clay. The thermofusible composition may comprise from 0 to 10 weight percent, preferably from about 3 to 7 weight percent, of the dusting agent.

Suitable thermal stabilizers include phenolics, hydroxyl amines, phosphates as well as combinations thereof. The thermofusible composition may comprise from 0.1 to 4 weight percent of the thermal stabilizer.

UV stabilizers, antioxidants, organic and inorganic fillers, pigments, releasing agents and dispersants are typically used in an amount of about 0.1 to 3 weight percent.

The process for the preparation of the above thermofusible composition comprises first melt blending all components except the dusting agent using known powder mixing apparatus, followed by cooling. The resulting composition is then pelletized or granulated and the granules or pellets thus obtained are cryogenically milled. Finally, the dusting agent is dry-blended with the powder resulting from the previous step. Alternatively, the resulting composition is prepared in the form of micropellets, having a particle size smaller than 1400 μm. Preferably, particles of a size ranging from 50 μm to 800 μm obtained either by milling or by micro-pelletizing are used. More preferably, the thermofusible composition comprises both powder (particle size smaller than 800 μm, preferably ranging from 0.01 μm to 500 μm) and micropellets.

The slush moulding is typically done in conventional equipment currently used with PVC based thermofusible compositions.

The following examples illustrate the present invention. It is understood that these examples are given for the purpose of illustration and do not limit the invention. In the examples, all parts and percentages are by weight based on the total weight of the composition unless otherwise specified.

EXAMPLES

In order to show the effect of different HSBC, eight formulations comprising 54.2 weight percent of HSBC were prepared. The specifications of the HSBC used are listed in Table 1, the other components and the amounts in which they were present in the formulations are listed in Table 2. Kraton A-1536, G-1650 and G1651, (Kraton is a registered trademark) as well as Polymers 4 and 5 are included for comparative purposes. These polymers are outside the scope of the present invention.

The thermofusible compositions were made by melt blending the ingredients, with the exception of the dusting agent under high shear conditions (e.g., using a single screw extruder, a double screw extruder or a Banbury mixer) resulting in micropellets or pellets. Micropellets have an average size of about 200 to 1000 micrometers. Pellets (particles characterized by at least a dimension larger than 1000 micrometer) were cryogenically milled. The cryogenically milling process transforms either micropellets or pellets to particles whose size is about 100 to 700 micrometers (this is the thermofusible powder). Micropellets and thermofusible powder were mixed together, within a range of from 0%-100% to 100%-0%). The dusting agent was added while cryogenically milling or mixed to the thermofusible composition.

TABLE 1

| Polymer | Distinguishing features |
|---|---|
| Kraton A-1536 | Commercial selectively hydrogenated* coupled [S(EB/S)]n block copolymer with "controlled distributed midblock", styrene blockiness index <10% and block A apparent number average mol weight ≥7.5 kg/mol (thus outside range as defined in [0041] under c. *selectively hydrogenated as described in [0041], under b. |
| Kraton G-1650 | Commercial selectively hydrogenated coupled [SEB]n block copolymer without "controlled distributed midblock" |
| Kraton G-1651 | Commercial selectively hydrogenated sequential SEBS block copolymer without "controlled distributed midblock" |
| Polymer 1 | Linear, selectively hydrogenated and coupled [S(EB/S)]n block copolymer with "controlled distributed midblock" with total polystyrene content 33% w/w, total apparent peak mol weight of 144 kg/mol, coupling efficiency >90%, block A mol weight of 7.3 kg/mol, block B vinyl content of 65% w/w, block B polystyrene content based on EB/S fraction of 22% w/w and styrene blockiness index <10% |
| Polymer 2 | Linear, selectively hydrogenated and coupled [S(EB/S)]n block copolymer with "controlled distributed midblock" with total polystyrene content 36% w/w, total apparent peak mol weight of 129 kg/mol, coupling efficiency >90%, block A mol weight of 6.4 kg/mol, block B vinyl content of 66% w/w, block B polystyrene content based on EB/S fraction of 22% w/w and styrene blockiness index <10% |
| Polymer 3 | Linear, selectively hydrogenated and coupled [S(EB/S)]n block copolymer with "controlled distributed midblock" with total polystyrene content 43% w/w, total apparent peak mol weight of 70 kg/mol, coupling efficiency >90%, block A mol weight of 6.8 kg/mol, block B vinyl content of 40% w/w, block B polystyrene content based on EB/S fraction of 25% w/w and styrene blockiness index <10% |
| Polymer 4 | Linear, selectively hydrogenated and coupled [S(EB/S)]n block copolymer with "controlled distributed midblock" with total polystyrene content 18% w/w (thus outside the claimed range), total apparent mol weight of 189 kg/mol (outside the claimed range), coupling efficiency >90%, block A number average mol weight of 5.3 kg/mol, block B vinyl content of 68% w/w, block B polystyrene content based on EB/S fraction of 10% w/w and styrene blockiness index <10%. |
| Polymer 5 | Linear, selectively hydrogenated and coupled [S(EB/S)]n block copolymer with "controlled distributed midblock" with total polystyrene content 34% w/w, total apparent mol weight of 75 kg/mol, coupling efficiency >90%, block A mol weight of 4.3 kg/mol (thus outside the claimed range), block B vinyl content of 72% w/w, block B polystyrene content based on EB/S fraction of 22% w/w and styrene blockiness index <10%. |

Formulations consisted typically of both micropellets and powder in proportion of 30:70 (weight percent).

TABLE 2

| Component | % | n°1 pbw | n°2 pbw | n°3 pbw | n°4 pbw | n°5 pbw | n°6 pbw | n°7 pbw | n°8 pbw |
|---|---|---|---|---|---|---|---|---|---|
| KRATON A-1536 | 54.2 | 63.5 | — | — | — | — | — | — | — |
| KRATON G-1650 E | 54.2 | — | 63.5 | — | — | — | — | — | — |
| KRATON G-1651 E | 54.2 | — | — | 63.5 | — | — | — | — | — |
| Polymer 1 | 54.2 | — | — | — | 63.5 | — | — | — | — |
| Polymer 2 | 54.2 | — | — | — | — | 63.5 | — | — | — |
| Polymer 3 | 54.2 | — | — | — | — | — | 63.5 | — | — |
| Polymer 4 | 54.2 | — | — | — | — | — | — | 63.5 | — |
| Polymer 5 | 54.2 | — | — | — | — | — | — | — | 63.5 |
| LyondellBasell PP Moplen EP648V | 8.5 | 10 | 10 | 10 | 10 | 10 | 10 | 10 | 10 |
| LyondellBasell Koattro AR 05 | 7.3 | 8.5 | 8.5 | 8.5 | 8.5 | 8.5 | 8.5 | 8.5 | 8.5 |

TABLE 2-continued

| Component | % | Formulation: n°1 pbw | n°2 pbw | n°3 pbw | n°4 pbw | n°5 pbw | n°6 pbw | n°7 pbw | n°8 pbw |
|---|---|---|---|---|---|---|---|---|---|
| LyondellBasell Polybutene-1 PB 0800 | 11.9 | 14 | 14 | 14 | 14 | 14 | 14 | 14 | 14 |
| White paraffinic oil | 7.7 | 9 | 9 | 9 | 9 | 9 | 9 | 9 | 9 |
| Master Polysiloxane | 4.3 | 5 | 5 | 5 | 5 | 5 | 5 | 5 | 5 |
| MASTER Black (PP) PLASBLAK 4623 | 2.6 | 3 | 3 | 3 | 3 | 3 | 3 | 3 | 3 |
| IRGANOX ™ 1010 | 0.3 | 0.35 | 0.35 | 0.35 | 0.35 | 0.35 | 0.35 | 0.35 | 0.35 |
| IRGAFOS ™ 168 | 0.2 | 0.23 | 0.23 | 0.23 | 0.23 | 0.23 | 0.23 | 0.23 | 0.23 |
| LOWILITE 26/TINUVIN 326/ UVASORB S26 | 0.3 | 0.35 | 0.35 | 0.35 | 0.35 | 0.35 | 0.35 | 0.35 | 0.35 |
| Magnesium Oxide MAGLITE D | 0.3 | 0.3 | 0.3 | 0.3 | 0.3 | 0.3 | 0.3 | 0.3 | 0.3 |
| Zinc Oxide | 2.6 | 3 | 3 | 3 | 3 | 3 | 3 | 3 | 3 |

Physical properties of the formulations were determined in order to select the formulations with the right performance characteristics, i.e.:
- hardness after 3 seconds greater than 50, preferably between 60 and 95 Shore A (ASTM-D2240);
- tensile strength of ≥8 MPa (ASTM D412-C); and
- pass the compound melting test.

The compound melting test was carried out in order to determine the suitability of a material to slush moulding/rotomoulding processing. The test indicates if a thermoplastic material fulfils certain prescribed melting behaviour characteristics when heated under controlled conditions. For this purpose, specimens of the formulations were carved from an injection moulding plaque. The length dimensions of the specimens were 50×2×2 mm. The melting behaviour was determined by placing a specimen during a fixed amount of time on a hot plate. The thickness of a specimen was measured before and after heating in order to determine the variation in thickness (Vt).

A specimen was indicated as "Pass" when both a visual and a thickness variation evaluation were indicated as positive. The visual evaluation was indicated as positive when the specimen after heating:
- showed rounded edges,
- did not show surface fails (dots, bubbles, pinholes), and
- did not look greasy/oily/sticky.

The thickness variation evaluation was indicated as positive if the variation of thickness (Vt) was more or equal to 50%.

The results of the melting tests are listed in Table 3, together with the physical properties as determined on injection moulded samples.

TABLE 3

| | Formulation | | | | | | | |
|---|---|---|---|---|---|---|---|---|
| | n°1 | n°2 | n°3 | n°4 | n°5 | n°6 | n°7 | n°8 |
| Hardness, Shore A | 81 | 87 | 81 | 74 | 72 | 83 | 76 | 74 |
| Tensile strength, MPa (ASTM D412-C) | 21.7 | 22.8 | 19.6 | 12.7 | 10.9 | 12.3 | 10.5 | 3.7 |
| Melting test | Fail | Fail | Fail | Fail | Pass | Pass | Fail | Pass |
| Overall conclusion | BAD | BAD | BAD | BAD | GOOD | GOOD | BAD | BAD |

The invention is embodied in formulation no. 5 and no. 6, the others are comparative. Only formulation no. 5 (polymer 2) and no. 6 (polymer 3) fulfilled the above criteria for Shore A hardness, tensile strength and compound melting test.

In Table 4 below the tensile strength ($\sigma$) and the elongation at break ($\varepsilon$) of formulations 3 and 5 are listed, together with the values of these properties as typically specified by car manufacturers. Formulation no. 3 is a comparative example not meeting the melting test and only just meeting the elongation requirement, while formulation no. 5 represents an example according to the invention which does meet these performance characteristics. The properties $\sigma$ and $\varepsilon$ were determined in accordance with DIN EN ISO 527-2 (specimen no 5A, test speed 100 mm/min). Thus, the values for the tensile strength ($\sigma$) in Table 3 and Table 4 are determined with different methods and therefore these values should not be compared with each other.

TABLE 4

| | OEM Specs | Ideal Specs | n° 5** | n° 3** |
|---|---|---|---|---|
| $\sigma$ (MPa) | 11 ± 2 | >8 | 16.0 | 8.1 |
| $\varepsilon$ (%) | ≥250 | ≥250 | 670 | 560 |

**Values determined in accordance with DIN EN ISO 527-2 (specimen no 5A, test speed 100 mm/min Effect of Component (iii):

In order to test the influence of the polybutylene component used in the formulation, three formulations were made, similar to the formulations above, however having different amounts of this component. Polymer 2 was used as HSBC. The formulation components and the amounts in which these components are present are listed in Table 5.

TABLE 5

| Component | % | Formulation: n° 9 pbw | n° 10 pbw | n° 11 pbw |
|---|---|---|---|---|
| Polymer 2 | 46.9 | 55 | 55 | 55 |
| LyondellBasell PP Moplen EP648V | 8.5 | 10 | 10 | 10 |
| LyondellBasell Koattro AR 05 | 26.5 | 8.5 (7.3%) | 31 | — |
| LyondellBasell Polybutene BP0800M | | 22.5 (19.2%) | — | 31 |
| White paraffinic oil | 7.7 | 9 | 9 | 9 |
| Master Polysiloxane | 4.3 | 5 | 5 | 5 |
| MASTER Black (PP) PLASBLAK 4623 | 2.6 | 3 | 3 | 3 |
| IRGANOX 1010 | 0.3 | 0.3 | 0.3 | 0.3 |
| IRGAFOS 168 | 0.2 | 0.23 | 0.23 | 0.23 |
| LOWILITE 26/TINUVIN 326/ UVASORB S26 | 0.3 | 0.35 | 0.35 | 0.35 |
| Magnesium Oxide MAGLITE D | 0.3 | 0.3 | 0.3 | 0.3 |
| Zinc Oxide | 2.6 | 3 | 3 | 3 |

The compound melting test was performed on the formulations in order to establish the optimal formulation composition. Melting tests were carried out at a temperature of 230 DEG C. and 260 DEG C. and resulted in the following evaluations.

TABLE 6

| formulation | test time (sec) | test temperature (DEG C.) | test result | visual evaluation | thickness variation |
|---|---|---|---|---|---|
| n° 9 | 90 | 230 | GOOD | positive | positive |
| n° 10 | 90 | 230 | BAD | negative | positive |
| n° 11 | 90 | 230 | BAD | negative | negative |
| n° 9 | 180 | 230 | GOOD | positive | positive |
| n° 10 | 180 | 230 | BAD | negative | positive |
| n° 11 | 180 | 230 | GOOD | positive | positive |
| n° 9 | 180 | 260 | GOOD | positive | positive |
| n° 10 | 90 | 260 | GOOD | positive | positive |
| n° 11 | 90 | 260 | GOOD | positive | positive |

The results illustrate that formulation no9 with a combination of a PB homopolymer and a PB copolymer is the formulation which satisfies the performance characteristics the most. Nonetheless, the results with elevated test temperatures also illustrate that it is possible to prepare satisfactory formulations with just a PB homopolymer (no11), or just a PB copolymer (no10).

The invention claimed is:

1. A thermofusible composition in the form of pellets and/or powder, with a particle size of 1400 μm or less comprising:
   (i) from about 40 to about 70 weight percent of a selectively hydrogenated styrenic block copolymer (HSBC) as defined hereinafter,
   (ii) from 0 to about 15 weight percent of a propylene homopolymer and/or propylene copolymer (PP),
   (iii) from about 1 to about 30 weight percent of a polybutylene (PB); wherein the polybutylene comprises wherein the PB comprises a butylene homopolymer (iiia) and a butylene copolymer (iiib), and a ratio of butylene homopolymer (iiia) vs. butylene copolymer (iiib) is from about 1:1 to about 10:1 and wherein a melt flow rate of (iiia), (iiib), or (iiic) is from about 0.1 to about 500 g/10 min measured at 190° C. employing a 2.16 kg weight,
   (iv) from 0 to about 20 weight percent of a plasticizing oil selected from naphthenic oils and paraffinic oils,
   (v) from 0 to about 10 weight percent of a scratching agent,
   (vi) from 0 to about 10 weight percent of a dusting agent, and
   (vii) from 0 to about 10 weight percent of one or more additives,
   wherein the HSBC (i) is a linear or branched hydrogenated block copolymer having the general configuration A-B-A, (A-B)n, (A-B-A)n, (A-B-A)nX, (A-B)nX or mixtures thereof, where n is an integer from 2 to about 30, and X is coupling agent residue and wherein:
   a. prior to hydrogenation each A block is a mono alkenyl arene polymer block and each B block is a controlled distribution copolymer block of at least one conjugated diene and at least one mono alkenyl arene;
   b. subsequent to hydrogenation about 0-10% of the arene double bonds have been reduced, and at least about 90% of the conjugated diene double bonds have been reduced;
   c. each A block has a number average molecular weight from about 5.0 to about 7.5 kg/mol and, wherein the linear HSBC has a total apparent number average molecular weight from about 70 to less than 144 kg/mol or the branched HSBC has a total apparent number average molecular weight from about 35 to about 75 kg/mol per arm;
   d. each B block comprises terminal regions adjacent to the A blocks that are rich in conjugated diene units and one or more regions not adjacent to the A blocks that are rich in mono alkenyl arene units;
   e. the total amount of mono alkenyl arene in the hydrogenated block copolymer is from about 20 to about 45 weight percent;
   f. the weight percent of mono alkenyl arene in each B block is from about 10 to about 40 weight percent;
   g. each B block has a styrene blockiness index of less than 10 percent; and
   h. the weight percent of vinyl in each B block is at least about 40 weight percent; and
   wherein the thermofusible composition has a Shore A hardness greater than 50 and a tensile strength greater than or equal to 8 MPa.

2. The thermofusible composition according to claim 1, wherein the mono alkenyl arene is styrene and wherein the conjugated diene is butadiene.

3. The thermofusible composition according to claim 1, wherein the HSBC (i) is present in an amount of 45 to 55 weight percent.

4. The thermofusible composition according to claim 1, wherein the linear HSBC has a total apparent number average molecular weight of 125 to less than 144 kg/mol.

5. The thermofusible composition according to claim 1, wherein the total amount of mono alkenyl arene in the HSBC is from about 30 to about 40 weight percent.

6. The thermofusible composition according to claim 1, wherein the weight percent of mono alkenyl arene in each B block is from about 15 to about 30 weight percent and, wherein the weight percent of vinyl in each B block is at least about 60 weight percent.

7. The thermofusible composition according to claim 1, wherein the butylene copolymer (iiib) has a melt flow rate of about 0.8 g/10 min measured at 190° C. employing a 2.16 kg weight.

8. The thermofusible composition according to claim 1, wherein the additive (iv) comprises one or more plasticizing agents, scratch resistant agents, dusting agents, colouring agents, stabilizers and/or fillers.

9. The thermofusible composition of claim 1, wherein said Shore A hardness is from about 60 to about 90, and said tensile strength is between 8 and 30 MPa.

10. A method for producing a fused thermoplastic layer on the inner surface of a mould using the thermofusible composition of claim 1, comprising the method steps of:
   a. pouring the thermofusible composition in the form of a powder and/or in the form of micropellets into the mould;
   b. rotating, or rotating and shaking, and heating the mould at conditions sufficient to sinter the thermofusible composition into a thermoplastic layer; and
   c. allowing the mould and the thermoplastic layer to cool.

11. The method according to claim 10, wherein the thermofusible composition is sintered at a temperature from about 180° C. to about 260° C.

12. An article comprising a fused thermoplastic layer, wherein the thermoplastic layer is based on the thermofusible composition of claim 1.

13. The article according to claim 12, wherein the article is a dashboard.

14. A thermofusible composition in the form of pellets and/or powder, with a particle size of 1400 µm or less comprising:
   (A) from about 40 to about 70 weight percent of a selectively hydrogenated styrenic block copolymer (HSBC) as defined hereinafter,
   (B) from about 1 to about 30 weight percent of a polybutylene (PB), wherein the PB comprises (i) a butylene homopolymer and (ii) a butylene copolymer and a ratio of butylene homopolymer (i) vs. butylene copolymer (ii) is from about 1:1 to about 10:1 and wherein a melt flow rate of (i), (ii), or (iii) is from about 0.1 to about 500 g/10 min measured at 190° C. employing a 2.16 kg weight,
   wherein the HSBC (i) is a linear or branched hydrogenated block copolymer having the general configuration A-B-A, (A-B)n, (A-B-A)n, (A-B-A)nX, (A-B)nX or mixtures thereof, where n is an integer from 2 to about 30, and X is coupling agent residue and wherein:
      a. prior to hydrogenation each A block is a mono alkenyl arene polymer block and each B block is a controlled distribution copolymer block of at least one conjugated diene and at least one mono alkenyl arene;
      b. subsequent to hydrogenation about 0-10% of the arene double bonds have been reduced, and at least about 90% of the conjugated diene double bonds have been reduced;
      c. each A block has a number average molecular weight from about 5.0 to about 7.5 kg/mol and, wherein the linear HSBC has a total apparent number average molecular weight from about 70 to less than 144 kg/mol or the branched HSBC has a total apparent number average molecular weight from about 35 to about 75 kg/mol per arm;
      d. the total amount of mono alkenyl arene in the hydrogenated block copolymer is from about 20 to about 45 weight percent;
      e. the weight percent of mono alkenyl arene in each B block is from about 10 to about 40 weight percent;
      f. each B block has a styrene blockiness index of less than 10 percent; and
      g. the weight percent of vinyl in each B block is at least about 40 weight percent; and wherein the thermofusible composition has a Shore A hardness greater than 50 and a tensile strength ≥to 8 MPa.

15. The thermofusible composition according to claim 14, wherein the mono alkenyl arene is styrene and wherein the conjugated diene is butadiene.

16. The thermofusible composition according to claim 14, wherein the HSBC is present in an amount of 45 to 55 weight percent.

17. The thermofusible composition according to claim 14, wherein the linear HSBC has a total apparent number average molecular weight of 125 to less than 144 kg/mol.

18. The thermofusible composition according to claim 14, wherein the total amount of mono alkenyl arene in the HSBC is from about 30 to about 40 weight percent.

19. The thermofusible composition according to claim 14, wherein the weight percent of mono alkenyl arene in each B block is from about 15 to about 30 weight percent, and wherein the weight percent of vinyl in each B block is at least about 60 weight percent.

20. The thermofusible composition according to claim 14, wherein the butylene copolymer has a melt flow rate of about 0.8 g/10 min measured at 190° C. employing a 2.16 kg weight.

21. The thermofusible composition according to claim 14, further comprising one or more plasticizing agents, scratch resistant agents, dusting agents, colouring agents, stabilizers and/or fillers.

22. The thermofusible composition of claim 14, wherein said Shore A hardness is from about 60 to about 90, said tensile strength is between 8 and 30 MPa, or the elongation at break is at least 250%.

23. An article comprising a fused thermoplastic layer, wherein the thermoplastic layer is based on the thermofusible composition of claim 14.

24. The article according to claim 23, wherein the article is a dashboard.

25. A thermofused composition comprising a uniformed blend before thermofusion of:
   (A) from about 40 to about 70 weight percent of a selectively hydrogenated styrenic block copolymer (HSBC) as defined hereinafter,
   (B) from about 1 to about 30 weight percent of a polybutylene (PB), wherein the PB comprises a butylene homopolymer (i) and a butylene copolymer (ii), and a ratio of butylene homopolymer (i) vs. butylene copolymer (ii) is from about 1:1 to about 10:1 and the butylene homopolymer wherein a melt flow rate of (i), (ii), or (iii) is from about 0.1 to about 500 g/10 min measured at 190° C. employing a 2.16 kg weight,
   wherein the HSBC (i) is a linear or branched hydrogenated block copolymer having the general configuration A-B-A, (A-B)n, (A-B-A)n, (A-B-A)nX, (A-B)nX or mixtures thereof, where n is an integer from 2 to about 30, and X is coupling agent residue and wherein:
      a. prior to hydrogenation each A block is a mono alkenyl arene polymer block and each B block is a controlled distribution copolymer block of at least one conjugated diene and at least one mono alkenyl arene;
      b. subsequent to hydrogenation about 0-10% of the arene double bonds have been reduced, and at least about 90% of the conjugated diene double bonds have been reduced;
      c. each A block has a number average molecular weight from about 5.0 to about 7.5 kg/mol and, wherein the linear HSBC has a total apparent number average molecular weight from about 70 to less than 144 kg/mol or the branched HSBC has a total apparent number average molecular weight from about 35 to about 75 kg/mol per arm;
d. the total amount of mono alkenyl arene in the hydrogenated block copolymer is from about 20 to about 45 weight percent;
e. the weight percent of mono alkenyl arene in each B block is from about 10 to about 40 weight percent;
f. each B block has a styrene blockiness index of less than 10 percent; and
g. the weight percent of vinyl in each B block is at least about 40 weight percent; and wherein the thermofusible composition has a Shore A hardness greater than 50 and a tensile strength ≥ to 8 MPa.

* * * * *